United States Patent [19]

Cresens

[11] Patent Number: 5,495,361
[45] Date of Patent: Feb. 27, 1996

[54] METHOD AND APPARATUS FOR SYNCHRONIZING THE POLARIZATION CONTROL SIGNAL OF AN AC-POLARIZED ARC-DISCHARGE LAMP WITH THE EXPOSURE TIMING SIGNALS OF A CCD LINE SENSOR

[75] Inventor: Marc L. Cresens, Bedford, Mass.

[73] Assignee: AGFA Division, Bayer Corporation, Wilmington, Mass.

[21] Appl. No.: 437,459

[22] Filed: May 8, 1995

[51] Int. Cl.⁶ .................................................. G02F 1/03
[52] U.S. Cl. .................. 359/246; 358/505; 358/509
[58] Field of Search ..................... 355/69, 67, 228, 355/229, 233; 358/505, 510, 509, 516; 359/246

[56] References Cited

U.S. PATENT DOCUMENTS

| | | | |
|---|---|---|---|
| 4,679,073 | 7/1987 | Hayashi | 358/80 |
| 4,891,690 | 1/1990 | Hasegawa et al. | 358/75 |
| 5,029,311 | 7/1991 | Brandkamp et al. | 355/30 |
| 5,083,214 | 1/1992 | Knowles | 358/403 |
| 5,298,961 | 3/1994 | Tajima | 355/202 |
| 5,336,976 | 8/1994 | Webb et al. | 315/134 |

*Primary Examiner*—Mark Hellner
*Attorney, Agent, or Firm*—John A. Merecki

[57] ABSTRACT

A method and apparatus for synchronizing the line time and color channel exposure timing signals of a CCD line sensor with the polarization control signal of an AC-polarized arc-discharge lamp in a scanning system. The scanning system comprises a scanner illumination system, including an AC-polarized arc-discharge lamp, for illuminating a document to be scanned, and a scanner imaging system for scanning the illuminated document in a line-wise manner. The scanning system of the present invention is designed to minimize brightness fluctuations on the document being scanned, improving the quality of the scanned image.

11 Claims, 5 Drawing Sheets

METHOD AND APPARATUS FOR SYNCHRONIZING THE POLARIZATION CONTROL SIGNAL OF AN AC-POLARIZED ARC-DISCHARGE LAMP WITH THE EXPOSURE TIMING SIGNALS OF A CCD LINE SENSOR

FIELD OF THE INVENTION

The present invention relates in general to scanning systems incorporating a light sensitive sensor arrangement such as a mono- or polychrome CCD (charge coupled device) line sensor. More particularly, the present invention is directed to a method and apparatus for synchronizing the polarization control signal of an AC-polarized arc-discharge lamp with the color channel exposure timing signals of a CCD line sensor.

BACKGROUND OF THE INVENTION

High efficiency AC-polarized arc-discharge lamps, such as metal-halide and medium source rare earth arc-discharge lamps, are quasi-point light sources which provide a high color temperature over a wide power range, especially in the blue color where CCD sensors commonly have a lower spectral responsivity. Generally, such arc-discharge lamps are driven by a periodic signal (e.g., a square wave) to balance the thermal dissipation of the electrodes within the lamp. Unfortunately, when an arc-discharge lamp is utilized as an illumination source in a scanning system, the polarization of the discharge between the electrodes of the lamp causes deleterious line-wise brightness variations on the target being scanned which are transferred to the scanned image. Since the human eye and brain are highly capable of detecting such line-wise brightness variations on the scanned image, arc-discharge lmps have heretofore not been incorporated into scanning systems.

SUMMARY OF THE INVENTION

The present invention provides a method and apparatus for substantially eliminating the line-wise brightness variations on an image being scanned associated with the utilization of an AC-polarized arc-discharge lamp in a scanning system. Specifically, the present invention provides a method and apparatus for synchronizing the polarization control signal of an AC-polarized arc-discharge lamp system with the color channel exposure timing signals of a CCD line sensor.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

The advantages afforded by the present invention are more easily understood by first analyzing the output of a scanning system incorporating a polychrome CCD line sensor and an AC-polarized arc-discharge lamp, wherein the polarization control signal of the AC-polarized arc-discharge lamp is not synchronized with the color channel exposure timing signals of the polychrome CCD line sensor.

Figure 1:
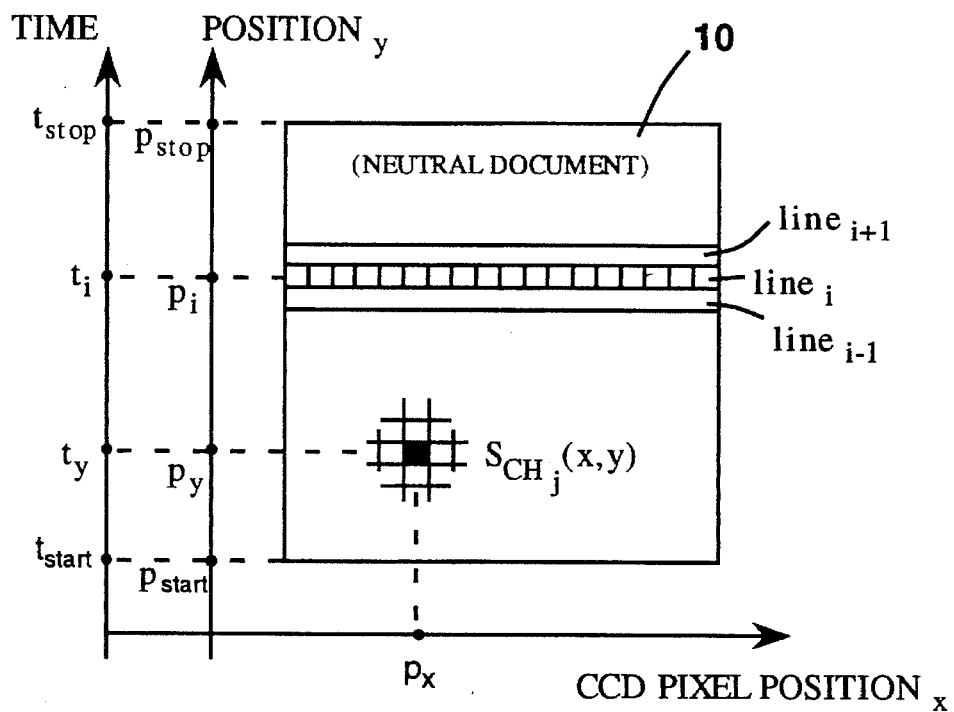
FIG. 1 illustrates the scanning of a neutral document with a CCD line sensor, wherein scanning data is provided at a plurality of CCD pixel positions for a series of scan lines (e.g., line i–1, line i, line i+1) between positions pstart (tstart) and pstop (tstop)
Figure 2:
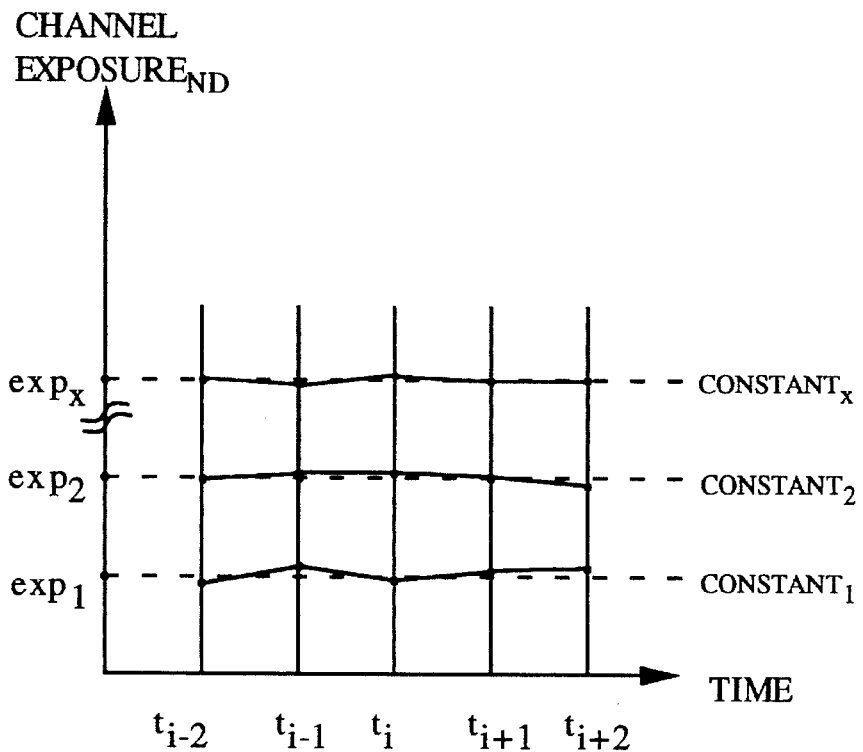
FIG. 2 illustrates the line-wise brightness fluctuations associated with the utilization of an AC-polarized arc-discharge lmp in a scanning system in which the polarization control signal of the AC-polarized arc-discharge lamp is not synchronized with the exposure timing signals of a CCD-line sensor.

In FIG. 1, a neutral document (ND) 10 is being scanned in a line-wise manner by an "unsynchronized" scanning system (not shown) including a polychrome CCD line sensor and an AC-polarized arc-discharge lamp. The neutral document 10 is defined to be a document having uniform greyscale, i.e., a document having a spectral spatial density $D(\lambda, t)$ wherein:

$$\frac{\partial D(\lambda,t)}{\partial x} = \frac{\partial D(\lambda,t)}{\partial y} = 0 \qquad \text{EQU. 1}$$

where $\begin{cases} \lambda\text{: wavelength} \\ t\text{: time (scan position } p) \end{cases}$ The polychrome CCD line sensor scans the neutral document 10 in a line-wise manner, providing scanning data for a series of scan lines (e.g., line i–1, line i, line i+1) between positions pstart (tstart) and pstop (tstop). As described in greater detail hereinbelow, the exposure of each color channel of an ideal polychrome CCD line sensor should remain constant when scanning a neutral document. Unfortunately, as illustrated in FIG. 2, line-wise brightness variations on the neutral document 10 being scanned, produced by the instability of the AC-polarized arc-discharge lamp, result in time varying channel exposures.

For a neutral document, the partial derivatives of the signal level $S_{CHj}(x, y)$ per CCD color channel j for all pixels of the scanned neutral document 10 should have the following properties, assuming an ideal CCD line sensor:

$$\frac{\partial S_{CHj}(x,y)}{\partial x} = 0 \qquad \text{EQU. 2}$$

$$\frac{\partial S_{CHj}(x,y)}{\partial y} = 0 \qquad \text{EQU. 3}$$

In practice, however, the signal level $S_{CHj}(x, y)$ generally varies across the thousands of individual CCD elements forming each color channel of a conventional CCD line sensor. Accordingly, as known in the art, the relationship defined by EQU. 2 is typically achieved by electronically equalizing the output signals of the CCD line sensor (e.g., under software control).

To achieve the relationship defined by EQU. 3, the exposure of each CCD color channel j per image-line i for the neutral document 10 must remain constant during the entire scan. Namely:

$$EXP_j(t_i) = \text{constant} \qquad \text{EQU. 4}$$

where
$$\begin{cases} t_{start} \leq t_i \leq t_{stop} \\ CH_1 \leq j \leq CH_x \; x = 1,2,3,\ldots \\ (x - \text{polychrome } CCD) \end{cases}$$

Further:

$$EXP_j(t_i) = \int_{\tau exp j} \int_{\lambda visual} B(\lambda,t) D(\lambda,t) OE(\lambda) CH(\lambda) d\lambda dt \qquad \text{EQU. 5}$$

where
$$\begin{cases} B(\lambda,t): \text{Brightness of Illuminated Document} \\ \qquad\qquad (\text{Reflect./Transmiss.}) \\ D(\lambda,t): \text{Neutral Document} \\ OE(\lambda): \text{Optical Efficiency of Imaging Optics} \\ CH(\lambda): \text{Spectral Responsivity of } CCD\text{-Channels} \end{cases}$$

Although the product $D(\lambda, t)\, OE(\lambda)\, CH(\lambda)$ in EQU. 5 remains constant throughout the scan, the brightness of the illuminated document $B(\lambda, t)$ fluctuates due to the varying brightness output of the AC-polarized arc-discharge lamp, leading to a variable channel exposure $EXP_j(t_i)$, contrary to the requirement of EQU. 4. An example of the variable channel exposure $EXP_j(t_i)$ of an x-polychrome CCD over several scan lines when utilizing an AC-polarized arc-discharge lamp is shown graphically in FIG. 2.

Figures 3A, 3B:
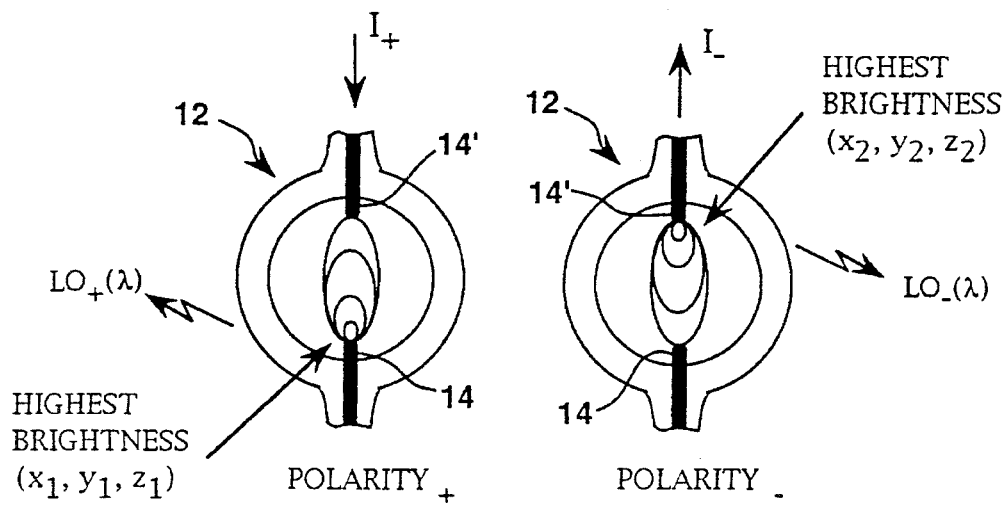
FIGS. 3A–3B and 4 illustrate the effects of lamp polarization on the light output (LO) and light coupling efficiency (LCE), respectively, of a typical AC-polarized arc-discharge lamp.
Figure 4:
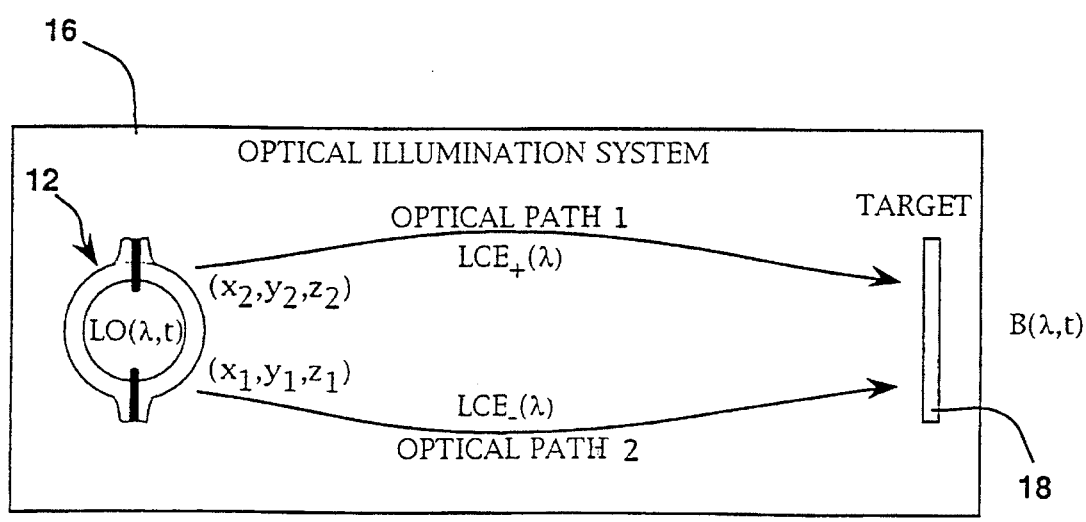

The brightness fluctuations associated with an AC-polarized arc-discharge lamp are described in detail with reference to FIGS. 3A, 3B and 4, which illustrate the effects of lamp polarization on the light output (LO) and light coupling efficiency (LCE), respectively, of an AC-polarized arc-discharge lamp 12. As known in the art, an AC-polarized arc-discharge lamp 12 generally includes a pair of electrodes 14, 14' which interchangeably serve as the cathode or anode of the lamp, depending upon the polarity of the driving voltage $V_{lamp}$. For example, as shown in FIG. 3A, electrodes 14 and 14' serve as the cathode (emission) and anode (reception), respectively, of the lamp 12, given a driving current $I_{lamp+}$. In this configuration, the highest brightness produced by the lamp is localized in the vicinity of the cathode, electrode 14. Analogously, as shown in FIG. 3B for a driving current $I_{lamp-}$, electrodes 14 and 14' serve as the anode (reception) and cathode (emission), respectively, of the lamp 12. Unlike the configuration of FIG. 3A, however, the highest brightness produced by the lamp is localized in the area of the cathode, electrode 14'. Thus, the location of highest brightness produced by an AC-polarized arc-discharge lamp varies in response to the polarity of the driving current $I_{lamp}$, and:

$$LO_+(\lambda) \neq LO_-(\lambda) \qquad \text{EQU. 6}$$

Expanding the above analysis to the optical illumination system 16 of a scanner incorporating an AC-polarized arc-discharge lamp (FIG. 4), it can also be shown that the performance of the optical illumination system is adversely affected by the varying location of highest brightness $(x_1, y_1, z_1) \leftarrow \rightarrow (x_2, y_2, z_2)$ within the AC-polarized arc-discharge lamp 12. As illustrated in FIG. 4, the optical path between the location of highest brightness and the target 18 being scanned varies as the driving current of the lamp $I_{lamp}$ changes polarity. As is known in the art, the target 18 being scanned generally corresponds to an actual document if a reflective original is being scanned, or to a diffuse screen if a transmissive original is being scanned. Accordingly, the light coupling efficiency of the AC-polarized arc-discharge lamp 12, when driven by a current $I_{lamp+}$ (FIG. 3A), is not equivalent to the light coupling efficiency of the lamp when driven by a current $I_{lamp-}$ (FIG. 3B). Namely:

$$LCE_+(\lambda) \neq LCE_-(\lambda) \qquad \text{EQU. 7}$$

Given that the brightness of the illuminated neutral document 10 $B(\lambda, t)$ is equal to:

$$B(\lambda,t) = LO(\lambda,t) \cdot LCE(\lambda, t) \qquad \text{EQU. 8}$$

it follows from EQU. 7 and 8 that the brightness of the illuminated neutral document 10 when the lamp is being driven by a positive polarity driving current $I_{lamp+}$ is not equal to the brightness of the illuminated neutral document when the lamp is driven by a negative polarity driving current $I_{lamp-}$ or, equivalently (see FIG. 5):

$$\frac{1}{\tau_{pol+}} \int_{\tau_{pol+}} B\lambda(\lambda,t) dt = B_+ \neq B_- = \qquad \text{EQU. 9}$$

$$\frac{1}{\tau_{pol-}} \int_{\tau_{pol-}} B\lambda(\lambda,t) dt$$

Figure 5:
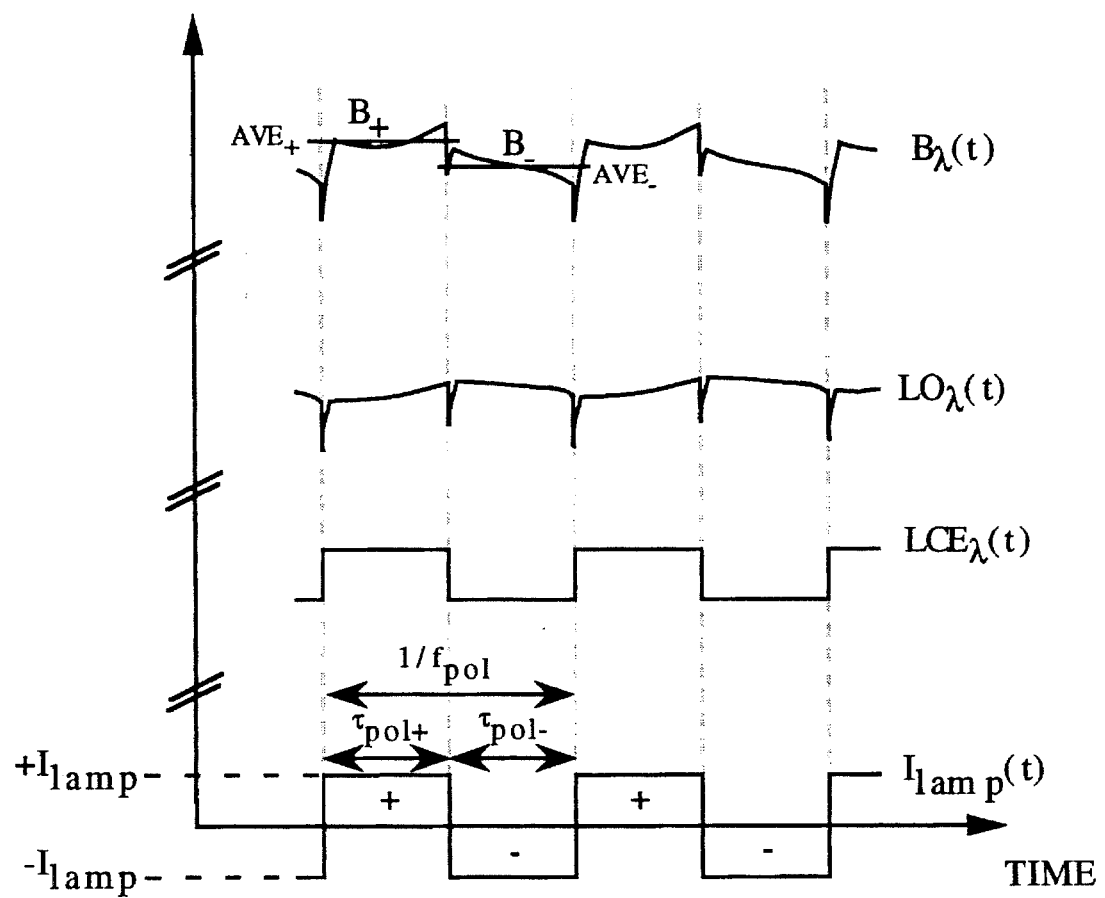
FIG. 5 further illustrates the effects of lamp polarization on the brightness (B) light output (LO) and light coupling efficiency (LCE) of a typical AC-polarized arc-discharge lamp.

The effects of an alternating driving current $I_{lamp}$ on the brightness $B(\lambda, t)$, light output $LO(\lambda, t)$ and light coupling efficiency $LCE(\lambda, t)$ of a typical AC-polarized arc-discharge lamp are illustrated in FIG. 5. As shown, the brightness $B(\lambda, t)$, light output $LO(\lambda, t)$ and light coupling efficiency $LCE(\lambda, t)$ of the AC-polarized arc-discharge lamp vary periodically in accordance with the polarization frequency $f_{pol}$ of the driving current $I_{lamp}$. Clearly, the average brightness $AVE_+$ provided by the AC-polarized arc-discharge lamp when driven by a positive polarity driving current $I_{lamp+}$ is not equal to the average brightness $AVE_-$ when the lamp is driven by a negative polarity driving current $I_{lamp-}$.

To substantially eliminate such line-wise brightness fluctuations, the present invention provides a method and apparatus for synchronizing the polarization control signal (i.e., the polarization frequency $f_{pol}$ of the lamp driving current $I_{lamp}$) of an AC-polarized arc-discharge lamp with the color channel exposure timing signals of a CCD line sensor. In accordance with the present invention, a CCD line sensor is defined as including one or more light sensitive CCD elements arranged in at least one linear array. Advantageously, the present invention is designed to provide each color channel of a CCD line sensor with a repeatable, temporally consistent exposure level EXP(t) from line to line of a scan, thereby eliminating the line-wise brightness fluctuations on an image being scanned caused by the periodic brightness output of a nonsynchronized AC-polarized arc-discharge lamp.

Figure 6:
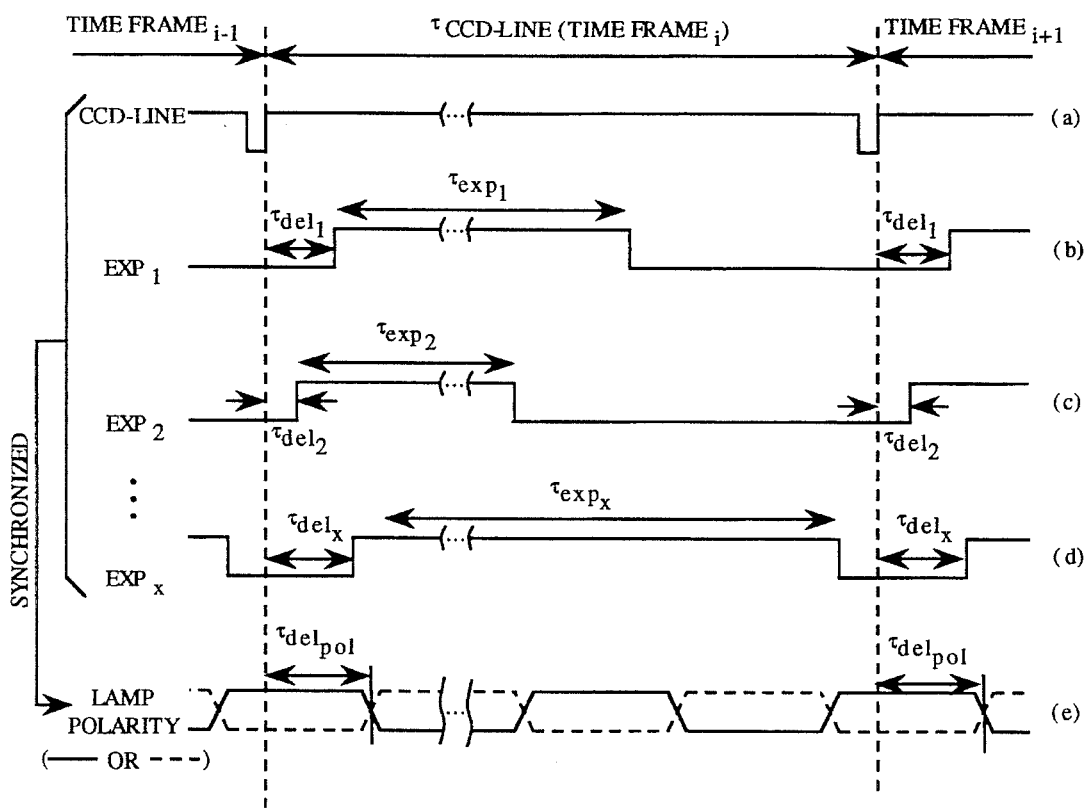
FIG. 6 is a timing diagram illustrating a method for synchronizing the polarization control signal of an AC-polarized arc-discharge lamp with the color channel exposure timing signals of a polychrome CCD line sensor in accordance with a preferred embodiment of the present invention.

A timing diagram illustrating a method in accordance with a preferred embodiment of the present invention is illustrated in FIG. 6. The timing diagram of FIG. 6 illustrates the fixed timing relationship between the exposure timing signals $EXP_j(t)$ ($1 \leq j \leq x$) for each color channel of an x-polychrome CCD line sensor, the polarization control signal of an AC-polarized arc-discharge lamp and the CCD line-time ($\tau_{CCD-LINE}$) of the CCD line sensor over a series of scan lines (TIME FRAME$_{i-1}$, TIME FRAME$_i$, TIME FRAME$_{i+1}$).

Referring first to line (a) of FIG. 6, the starting point and duration of each scan line are controlled by the CCD-LINE signal, wherein each scan line is initiated in response to the detection of a predetermined edge of the CCD-LINE signal. In line (a) of FIG. 6, for example, TIME FRAME$_i$ and TIME FRAME$_{i+1}$ are sequentially initiated by successive positive edges of the CCD-LINE signal.

As illustrated in lines (a) and (e) of FIG. 6, the present invention synchronizes the polarization frequency $f_{pol}$ of the lamp driving current $I_{lamp}$ to the frequency $f_{CCD-LINE}$ of the CCD-LINE signal. This is achieved by setting the polarization frequency $f_{pol}$ to an integer multiple of the frequency $f_{CCD-LINE}$ of the CCD-LINE signal, thereby forcing the lamp driving current $I_{lamp}$ to initially change polarity at a predetermined time $\tau pol_{del}$ relative to the beginning of each scan line.

Further, as shown in lines (b)-(d) of FIG. 6, the present invention synchronizes the exposure start time $\tau_{del}$ and duration of exposure $\tau_{exp}$ of each color channel to the start time and duration $\tau_{CCD-LINE}$ of each scan line, effectively synchronizing the exposure of each color channel of the x-polychrome CCD line sensor to the polarization frequency $f_{pol}$ of the driving current $I_{lamp}$. By utilizing such a synchronization process, each color channel of the CCD line sensor is individually subjected to a specific, repeatable exposure level EXP(t) during each successive scan line, thereby eliminating line-wise brightness fluctuations on the image being scanned.

In accordance with the preferred embodiment of the present invention, the synchronization criteria for an x-polychrome CCD-line sensor are as follows:

$$\begin{cases} f_{pol} = i \cdot f_{CCD-LINE} \\ i \geq 1,2,3,\ldots \\ f_{min} \leq f_{pol} \leq f_{max} \end{cases}$$

and $$\begin{cases} \tau del_{pol}/\tau_{CCD-LINE} = \text{CONSTANT} \\ \tau del_j/\tau_{CCD-LINE} = \text{CONSTANT} \\ \tau exp_j/\tau_{CCD-LINE} = \text{CONSTANT} \\ 0 \leq \tau del_j + \tau exp_j \leq \tau_{CCD-LINE} \\ 1 \leq j \leq x \end{cases}$$

where $f_{min}$ and $f_{max}$ represent the minimum and maximum operating frequencies, respectively, of the lamp polarization control signal as determined by the lamp manufacturer.

Figure 7:
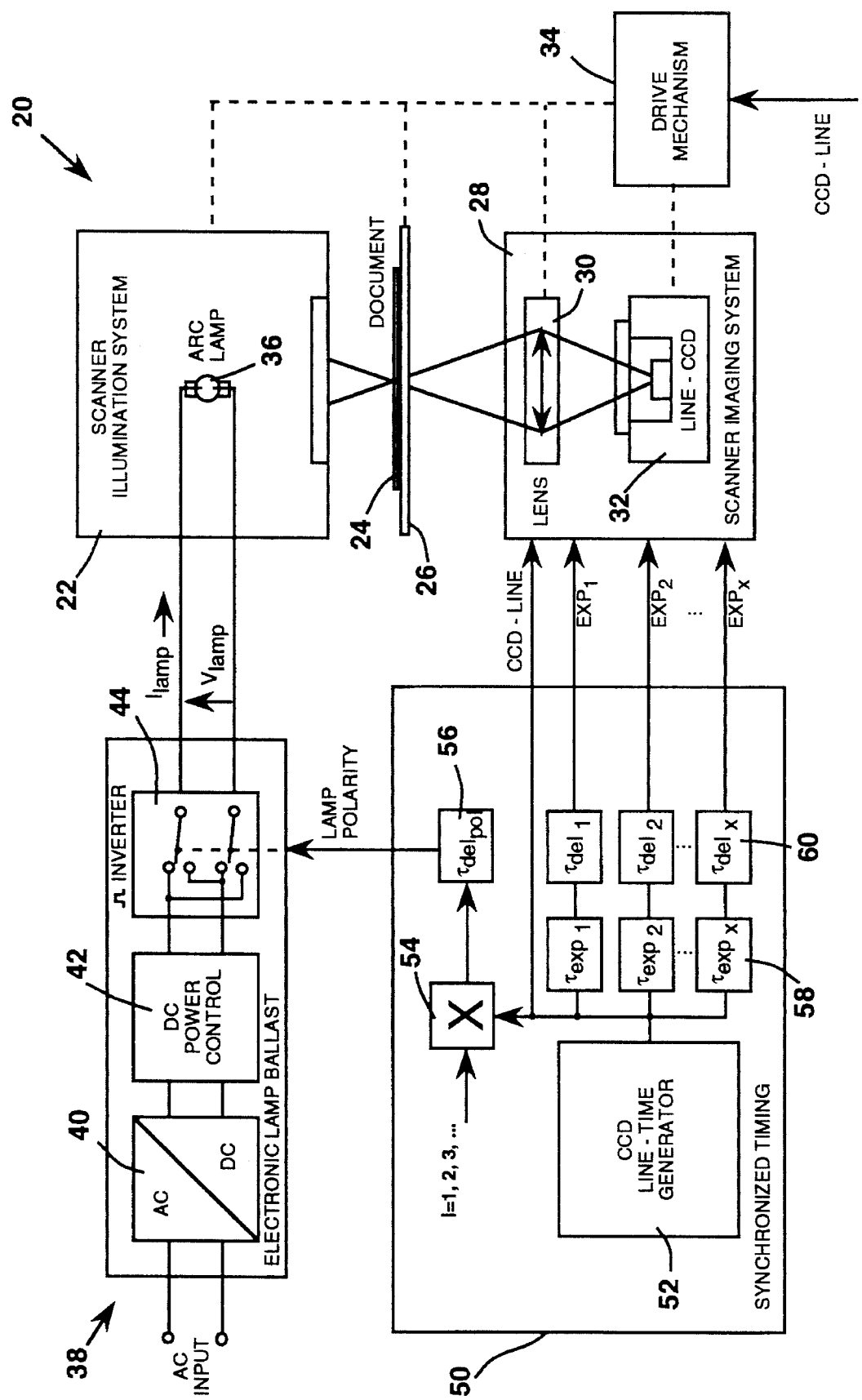
FIG. 7 illustrates a scanning system incorporating an apparatus for carrying out the method shown in FIG. 6.

A scanning system 20, including a synchronized timing apparatus 50 for carrying out the above-described method, is illustrated in FIG. 7. The scanning system 20 incorporates a scanner illumination system 22 for illuminating a transmissive document 24 supported on a document platen 26, and a scanner imaging system 28, having a lens 30 and a CCD line sensor 32, for scanning the illuminated document 24 in a line-wise manner. A drive mechanism 34 is utilized to displace one or more components of the scanning system 20 relative to the transmissive document 24, thereby providing the CCD line sensor 32 with successive lines of imaging data. Although the scanning system 20 illustrated in FIG. 7 is configured as a transmissive scanning system, it should be readily apparent to those skilled in the art that an equivalent scanner illumination system exists for reflective scanning.

The scanner illumination system 22 additionally comprises an AC-polarized arc-discharge lamp 36 which is driven by a square wave ($V_{lamp}$, $I_{lamp}$) produced by an electronic lamp ballast 38. As known in the art, the electronic lamp ballast 38 typically comprises an AC/DC converter 40 for converting an AC input to a DC signal, a DC power control 42 for regulating the output of the AC/DC converter 40, and a switch assembly 44 for converting the output of the DC power control 42 to a periodic squarewave. The polarization frequency $f_{pol}$ of the driving current $I_{lamp}$ is regulated by a polarization control (LAMP POLARITY) signal produced by the synchronized timing apparatus 50 and provided to the switch assembly 44 of the electronic lamp ballast 38.

The synchronized timing apparatus 50 includes a CCD line-time generator 52 which generates the CCD-LINE signal for controlling the line-time ($\tau_{CCD-LINE}$) of each scan line. As illustrated in FIG. 6, the CCD-LINE signal is a periodic signal having a frequency $f_{CCD-LINE}=1/\tau_{CCD-LINE}$. Generally, as known in the art, the duration of each scan line is dependent upon specific system criteria such as the available brightness output of the scanner illumination system, the characteristics of the CCD line sensor, and the required signal to noise ratio (% CCD saturation).

The synchronization between the CCD-LINE signal and the polarization control (LAMP POLARITY) signal is provided by passing the CCD-LINE signal through an integer multiplier 54 and a delay block 56, thereby ensuring that the polarization control signal remains consistent from line to line of a scan, always changing polarity at a predictable time $\tau pol_{del}$ after the beginning of each scan line. As stated above with reference to FIG. 6, the frequency of the polarization control signal $f_{pol}$ (i.e., the frequency of the driving current $I_{lamp}$) and the time delay $\tau pol_{del}$ are controlled and held constant throughout the scan, preferably under software control, such that for each line of the scan:

$$\begin{cases} f_{pol} = i \cdot f_{CCD-LINE} \\ i \geq 1,2,3,\ldots \\ f_{min} \leq f_{pol} \leq f_{max} \\ \tau del_{pol}/\tau_{CCD-LINE} = \text{CONSTANT} \end{cases}$$

The synchronization between the CCD-LINE signal and the color channel exposure timing signals EXP$_j$ of the CCD line sensor 32, as illustrated in lines (b)-(d) of FIG. 6, is achieved for each color channel by passing the CCD-LINE signal through a color channel exposure timing block 58 and a delay block 60. Although each color channel exposure timing block 58 and delay block 60 is illustrated as a discrete system component, the operation performed by each of these blocks is preferably performed under software, firmware and/or dedicated hardware control via the controller board (not shown) of the CCD line sensor 32.

The color channel exposure timing blocks 58 are utilized to set the length of exposure ($\tau_{exp}$) for each color channel x of the CCD line sensor 32, preferably exposing each color channel to saturation to maximize the output signal to noise ratio. Similarly, each respective delay block 60 is utilized to set the exposure start time ($\tau_{del}$) of each color channel relative to the start time and duration ($\tau_{CCD-LINE}$) of each scan line. Again, with reference to FIG. 6, the length of exposure $\tau_{exp}$ and exposure start time $\tau_{del}$ of each color channel of the x-polychrome line sensor 32 remain constant throughout the scan such that for each line of the scan:

$$\begin{cases} \tau del_j/\tau_{CCD\text{-}LINE} = \text{CONSTANT} \\ \tau exp_j/\tau_{CCD\text{-}LINE} = \text{CONSTANT} \\ 0 \leq \tau del_j + \tau exp_j \leq \tau_{CCD\text{-}LINE} \\ 1 \leq j \leq x \end{cases}$$

Having described in detail a preferred embodiment of my invention, it will now be apparent to those skilled in the art that numerous modifications can be made therein without departing from the scope of the invention as defined in the following claims.

What I claim is:

1. In a scanning system including an array of light sensitive sensors and a polarized arc-discharge lamp arrangement for illuminating said array of light sensitive sensors during a plurality of successive scan lines, a method for synchronizing a periodic polarization control signal of said polarized arc-discharge lamp arrangement with an exposure time of said array of light sensitive sensors, comprising the steps of:

synchronizing a polarity change of the periodic polarization control signal of said polarized arc-discharge lamp arrangement with a start time of each scan line, said polarity change occurring a predetermined time after the start time of each scan line;

exposing said array of light sensitive sensors for a predetermined length of time during each scan line; and initiating said exposure step a predetermined time after the start time of each scan line.

2. The method according to claim 1, wherein said plurality of successive scan lines occur at a frequency $f_{CCD\text{-}LINE}$ and said periodic polarization control signal has a polarization frequency $f_{pol}$, and wherein, during said synchronization step, said polarization frequency $f_{pol}$ and said scan line frequency $f_{CCD\text{-}LINE}$ are constrained such that:

$$f_{pol} = i \cdot f_{CCD\text{-}LINE}$$

$$i \geq 1, 2, 3 \ldots$$

3. The method according to claim 2, wherein, during said synchronization step, said periodic polarization control signal changes polarity at a predetermined time $\tau del_{pol}$ after the start time of each scan line, each scan line occurring for a time $\tau_{CCD\text{-}LINE}$, and wherein $\tau del_{pol}$ and $\tau_{CCD\text{-}LINE}$ are constrained such that:

$$\tau del_{pol}/\tau_{CCD\text{-}LINE} = \text{CONSTANT}.$$

4. The method according to claim 2, wherein, during said exposing step, said array of light sensitive sensors is exposed for a predetermined length of time $\tau_{exp}$, and wherein during said initiating step the exposure of said array of light sensitive sensors is initiated at a predetermined time $\tau_{del}$ after the start time of each scan line, each scan line occurring for a time $\tau_{CCD\text{-}LINE}$, $\tau_{exp}$ and $\tau_{del}$ being constrained such that:

$\tau del/\tau_{CCD\text{-}LINE} = \text{CONSTANT}$ $\tau exp/\tau_{CCD\text{-}LINE} = \text{CONSTANT}$ $0 \leq \tau del + \tau exp \leq \tau_{CCD\text{-}LINE}.$ 5. The method according to claim 4, wherein said array of light sensitive sensors is an x-polychrome CCD line sensor having an x-number of color channels ($x \geq 1$), and wherein:

$\tau del_j/\tau_{CCD\text{-}LINE} = \text{CONSTANT}$ $\tau exp_j/\tau_{CCD\text{-}LINE} = \text{CONSTANT}$ $0 \leq \tau del_j + \tau exp_j \leq \tau_{CCD\text{-}LINE}$ $1 \leq j \leq x.$ 6. A method for scanning an image comprising the steps of:

illuminating said image with a polarized arc-discharge lamp;

driving said polarized arc-discharge lamp with a periodic polarization control signal;

scanning successive lines of said illuminated image with a light sensitive sensor arrangement to provide ..t. digital representation of a series of scan lines each scan line occurring for a first predetermined time $T_1$; and synchronizing a polarity change of said periodic polarization control signal with a start time of each scan line, said polarity change occurring a predetermined time $T_2$ after the start of each scan line, wherein $T_2/T_1$ remains constant.

7. The method according to claim 6 further including steps of:

exposing said light sensitive sensor arrangement to each successive line of said illuminated image, said light sensitive sensor being exposed to each line of said illuminated image for a predetermined time $T_3$, wherein $T3/T1$ remains constant; and initiating said exposure step a predetermined time $T_4$ after the start time of each scan line, wherein $T4/T1$ remains constant.

8. The method according to claim 1, wherein said polarized arc-discharge lamp arrangement includes a metal halide arc-discharge lamp.

9. The method according to claim 1, wherein said polarized arc-discharge lamp arrangement includes a medium source rare-earth arc-discharge lamp.

10. The method according to claim 6, wherein said polarized arc-discharge lamp is a metal halide arc-discharge lamp.

11. The method according to claim 6, wherein said polarized arc-discharge lamp is a medium source rare-earth arc-discharge lamp.

* * * * *